(12) United States Patent
Arikita

(10) Patent No.: US 6,896,427 B2
(45) Date of Patent: May 24, 2005

(54) AUTOMATIC PRINTER AND PATTERN CONNECTING POSITION CORRECTING PRINTING METHOD IN PRINTING PATTERN ON PRINTING OBJECT MEDIUM

(75) Inventor: Reiji Arikita, Wakayama (JP)

(73) Assignee: Shima Seiki Mfg., Ltd., Wakayama (JP)

( * ) Notice: Subject to any disclaimer, the term of this patent is extended or adjusted under 35 U.S.C. 154(b) by 0 days.

(21) Appl. No.: 10/491,751

(22) PCT Filed: Oct. 2, 2002

(86) PCT No.: PCT/JP02/10317

§ 371 (c)(1), (2), (4) Date: Apr. 5, 2004

(87) PCT Pub. No.: WO03/031187

PCT Pub. Date: Apr. 17, 2003

(65) Prior Publication Data

US 2004/0246286 A1 Dec. 9, 2004

(30) Foreign Application Priority Data

Oct. 5, 2001 (JP) ........................................ 2001-310096

(51) Int. Cl.$^7$ .............................. B41J 11/44; B41F 3/40; G06K 9/00
(52) U.S. Cl. .......................... 400/76; 101/365; 382/112; 382/162
(58) Field of Search .......................... 400/76; 101/365, 101/183, 228, 483; 382/112, 162; 358/1.15; 347/105

(56) References Cited

U.S. PATENT DOCUMENTS

| | | | | |
|---|---|---|---|---|
| 4,396,940 A | * | 8/1983 | Tanaka et al. | 358/527 |
| 4,827,526 A | * | 5/1989 | Matsumoto | 382/112 |
| 5,163,012 A | * | 11/1992 | Wuhrl et al. | 382/112 |
| 5,208,870 A | * | 5/1993 | Ennis | 382/143 |
| 5,365,596 A | * | 11/1994 | Dante et al. | 382/141 |
| 5,724,437 A | * | 3/1998 | Bucher et al. | 382/112 |
| 6,137,903 A | * | 10/2000 | Dichter | 382/162 |
| 6,382,101 B1 | * | 5/2002 | Richards | 101/365 |
| 6,655,275 B2 | * | 12/2003 | Mugrauer | 101/228 |

FOREIGN PATENT DOCUMENTS

JP 11-291467 10/1999

* cited by examiner

Primary Examiner—Andrew H. Hirshfeld
Assistant Examiner—Waasseem H Hamdan
(74) Attorney, Agent, or Firm—Wenderoth, Lind & Ponack, L.L.P.

(57) ABSTRACT

An automatic printer 1 prints a portion of a pattern onto an allocated region of a print medium 3, picks up the image of this printed pattern using an image pickup device 6, and after the image pickup, forwards the printed region portion to position a next allocated region in an effective printing region 16. Then, the automatic printer 1 again picks up the image of the above-described printed pattern using the image pickup device 6, and compares these two images. When these images deviate from each other, the automatic printer 1 makes a correction, and performs printing in a state where the joint position of the pattern precedently printed and that of a pattern to be next printed conformed to each other.

2 Claims, 4 Drawing Sheets

AUTOMATIC PRINTER AND PATTERN CONNECTING POSITION CORRECTING PRINTING METHOD IN PRINTING PATTERN ON PRINTING OBJECT MEDIUM

TECHNICAL FIELD

The present invention relates to an automatic printer in the case where patterns are printed onto a print medium (paper, fabric, knit cloth, or the like) intermittently fed by a conveying device.

BACKGROUND ART

To date, when printing a desired pattern onto a long fabric such as cloth, which is an example of print medium, by an automatic printer, the long fabric has been conveyed to a predetermined place by a conveying device such as a belt conveyer, and a carriage has been moved that has an ink jet section of printing means provided so as to be moved by a controller in the forward/backward and right/left directions above the predetermined place, whereby a pattern has been printed onto the long fabric.

In this case, pattern data longer than the effective printing region of the predetermined place is allocated to a plurality of regions, and a portion of the pattern is printed on a preceding allocated region by printing means. After the printing, the long fabric is conveyed so that a next drawing region in the long fabric is conveyed to the above-described predetermined place, and subsequently, another pattern is consecutively printed onto an end of the pattern precedently drawn. After the printing, the above-described process is repeated, thereby printing consecutive patterns or patterns of a plurality of components one after another.

However, when conveying a long fabric to a predetermined place by a conveying device such as a belt conveyor, the long fabric under conveyance may be not positioned in the predetermined place and cause a position deviation due to meandering of the long fabric, and/or a slip of the long fabric caused by its contact with the conveyance surface. This raises a problem in that printing is unfavorably performed in a state where the end of the pattern printed in a preceding allocated region in the long fabric does not coincide with the beginning of the pattern contiguous to the above-described pattern.

The present invention has been developed to overcome the above problem. The object of the present invention is to provide an automatic printer that, when a pattern during printing interrupted by intermittent feeding of a print medium is to be subsequently printed in printing a consecutive pattern, are capable of printing so as to prevent the occurrence of a deviation in the joint of the aforementioned pattern with the pattern precedently printed, in the printing of consecutive patterns, in the case where the pattern is printed onto the print medium intermittently fed by a conveying device by an ink jet type automatic printer.

DISCLOSURE OF INVENTION

In order to achieve the above-described object, in an automatic printer of the present invention, the automatic printer comprising:

a conveying device for intermittently conveying a print medium to a predetermined place;

a moving device provided above the predetermined place and having a carriage that is moved thereby in an arbitrary direction;

printing means having an ink jet section mounted on the carriage, for printing a pattern onto the print medium;

an image pickup device mounted on the carriage, for picking up the image of a pattern printed on the print medium in the predetermined place; and a controller for controlling the conveying device, moving device, printing means, and image pickup device, wherein the controller performs control operations comprising:

allocating pattern data longer than the effective printing region in the predetermined place to a plurality of regions;

printing a portion of the pattern onto a preceding allocated region by the printing means;

picking up images of the pattern portions including, in the printed pattern, the boundary between the pattern already printed and a portion to be next printed in the conveying direction of the print medium, and the boundary between the printed portion and the non-printed portion in the width direction of the print medium;

forwarding, after the image pickup, the printed region portion from the effective printing region in order to position a next allocated region in the effective region;

again picking up the pattern portion of which the image has been picked up by an image pickup device;

mutually comparing the images of the respective patterns picked up before and after the forwarding;

performing, when said two images are deviated from each other, an arithmetic correction so that said two images coincide with each other;

correcting reference pattern print data with respect to the image position of the precedently printed pattern; and performing a printing operation in a state where the joint position of the pattern precedently printed and that of a pattern to be next printed are conformed to each other.

Further, the automatic printer, according to the present invention, comprising:

a conveying device for intermittently conveying a print medium to a predetermined place;

a moving device provided above the predetermined place and having a carriage that is moved thereby in an arbitrary direction;

printing means having an ink jet section mounted on the carriage, for printing a pattern onto the print medium;

an image pickup device mounted on the carriage, for picking up the image of a pattern printed on the print medium in the predetermined place; and a controller for controlling the conveying device, moving device, printing means, and image pickup device, wherein the controller performs control operations comprising:

allocating pattern data longer than the effective printing region in the predetermined place to a plurality of regions;

printing a portion of the pattern onto a preceding allocated region by the printing means;

forwarding the printed region portion from the effective printing region in order to position a next allocated region in the effective region;

thereafter picking up the image of at least one portion of the pattern in the forwarded allocated region by the image pickup device;

comparing the picked-up image with reference pattern print data;

performing, when the positions of the images in the corresponding portions are deviated from each other, an arithmetic correction to the deviation; and performing a printing operation in a state where the joint position of the pattern precedently printed and that of a pattern to be next printed are conformed to each other.

BEST MODE FOR CARRYING OUT THE INVENTION

Hereinafter, an embodiment according to the present invention will be described.

Figure 1:
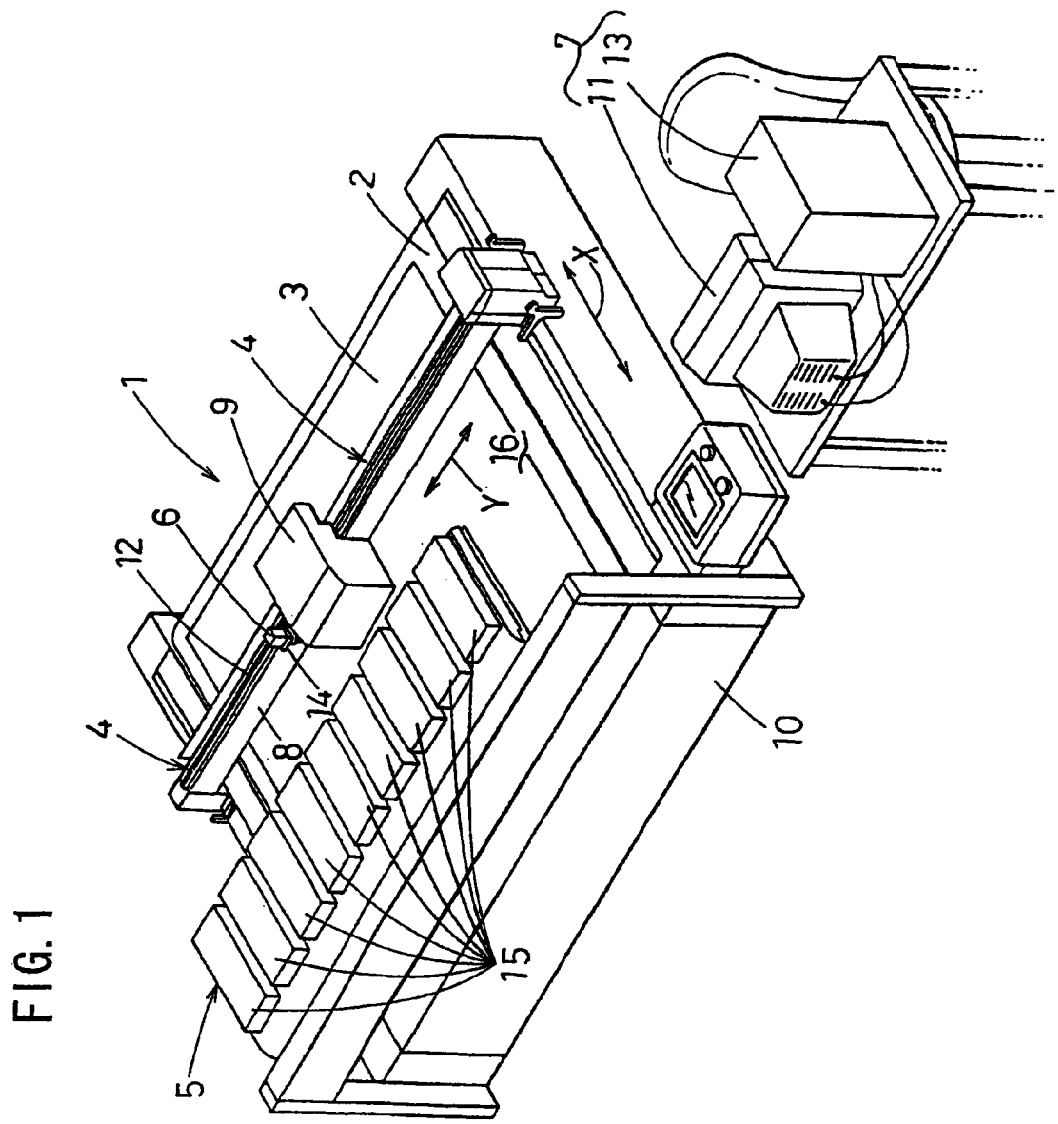
FIG. 1 is a diagram explaining an ink jet type automatic printer as an example of the present invention.
Figure 2:
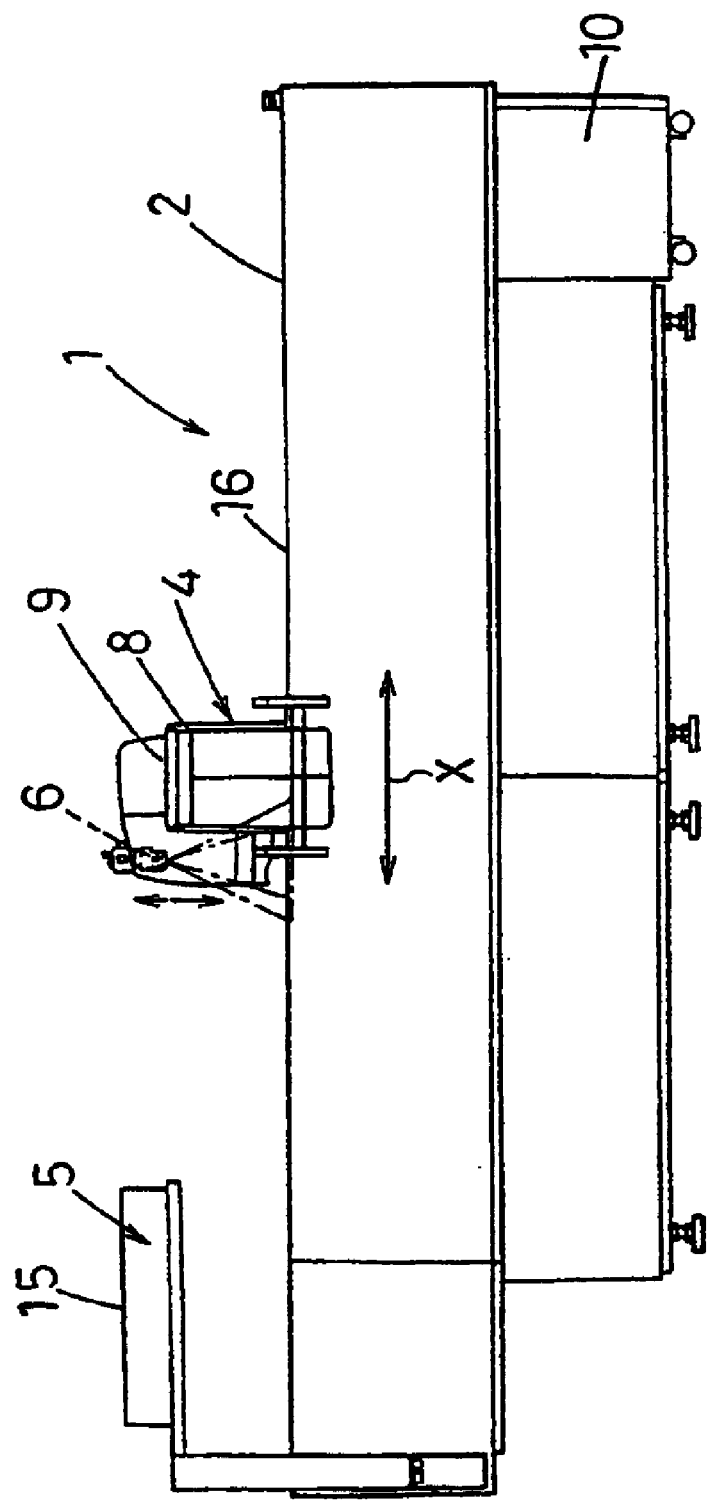
FIG. 2 is a side view of the automatic printer shown in FIG. 1.
Figure 3:
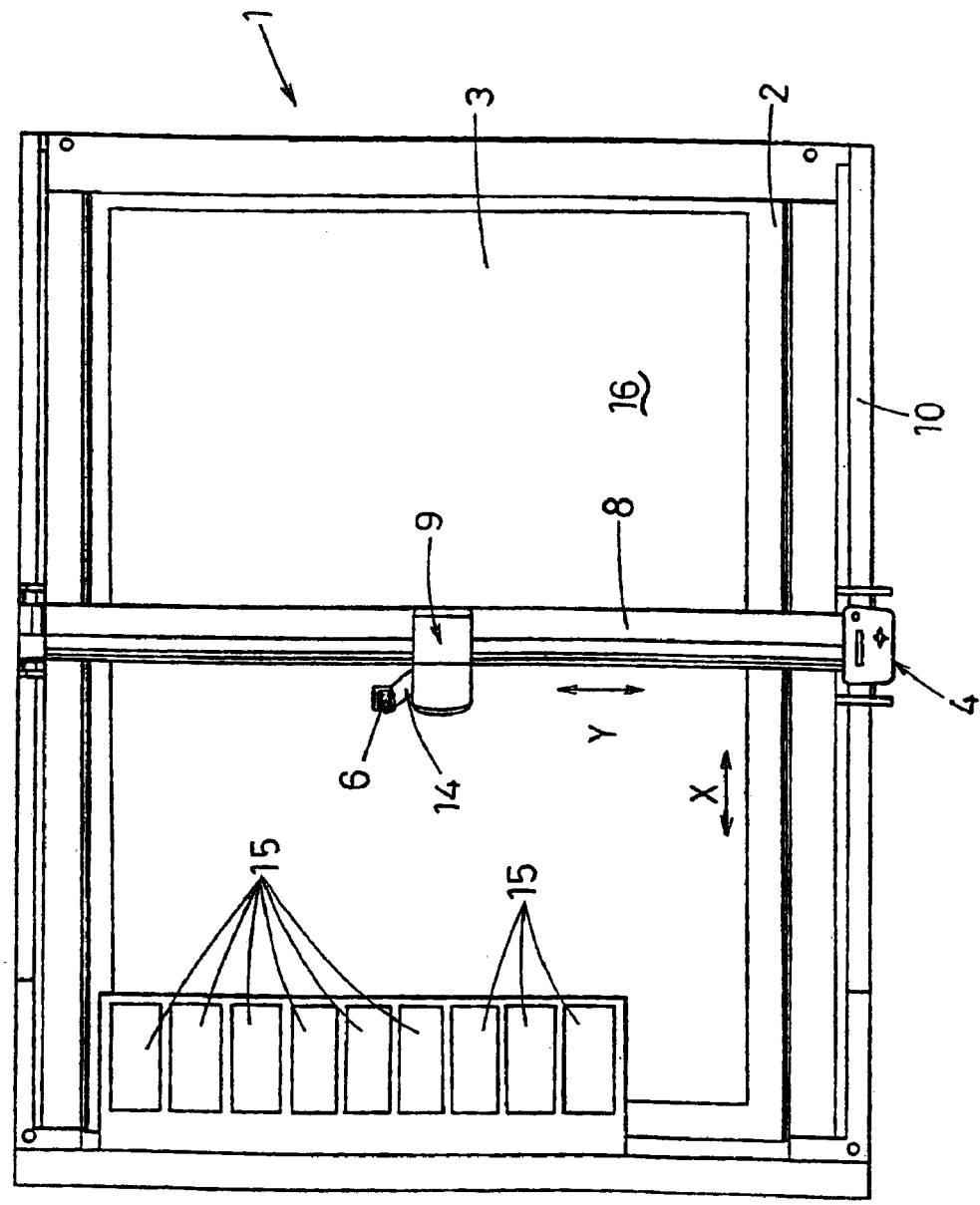
FIG. 3 is a plan view of the automatic printer shown in FIG. 1.
Figure 4:
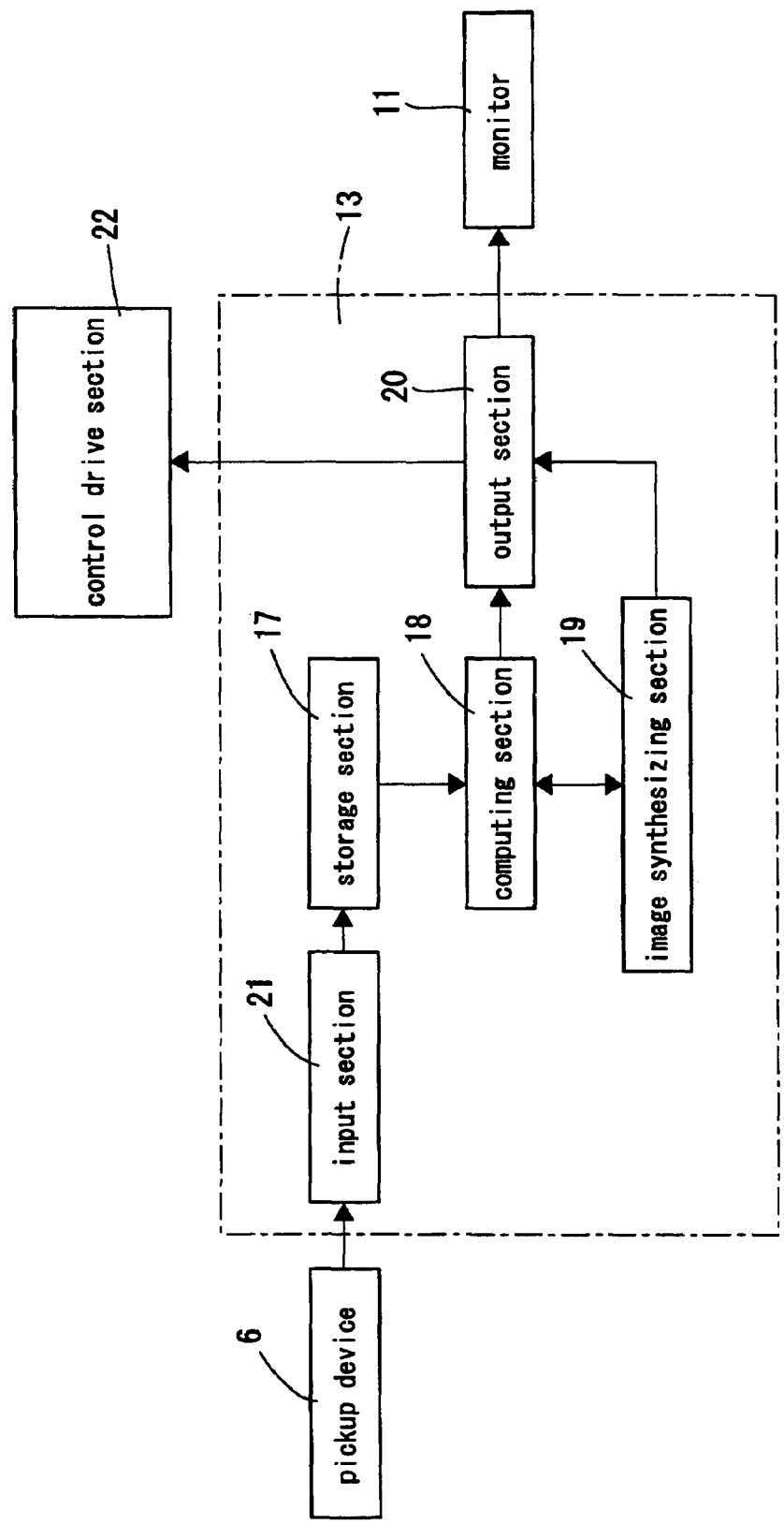
FIG. 4 is a block diagram of a control mechanism for printing patterns.

FIG. 1 is a diagram explaining an ink jet type automatic printer as an example of the present invention; FIG. 2 is a side view of the automatic printer shown in FIG. 1; FIG. 3 is a plan view of the automatic printer shown in FIG. 1; and FIG. 4 is a block diagram of a control mechanism for printing patterns.

In FIGS. 1 to 4, reference numeral 1 denotes an ink jet type automatic printer as an example of the present invention. This ink jet type automatic printer 1 comprises a conveying device 2 for conveying a print medium 3; a moving device 4 provided above a predetermined place and having a carriage 9 that is moved thereby in an arbitrary direction; printing means 5 for printing a pattern onto the print medium 3; an image pickup device 6 for picking up the image of a pattern printed on the print medium 3 in the predetermined place; and a controller 7 for controlling the above-described conveying device 2, moving device 4, printing means 5, and image pickup device 6.

The controller 7 controls operations of the conveying device 2, moving device 4, printing means 5, and image pickup device 6. Also, the controller 7 performs control operations such that pattern data longer than the effective printing region 16 of the predetermined place is allocated to a plurality of regions to thereby print the pattern onto the print medium 3; and when the position of a next allocated region of the print medium 3 that is contiguous deviates from the regular position due to the conveyance of the print medium 3, an position correction is made; and printing is performed in a state where the joint position of a pattern precedently printed and that of a pattern to be next printed are conformed to each other.

The conveying device 2 is formed of a belt conveyor or the like so as to constitute a flat predetermined place (the surface of a printing working table) for placing the print medium 3 thereon and printing a desired pattern, and it is arranged so that the belt can be rotationally moved in an intermittent manner under the control of the controller 7.

The moving device 4 comprises a moving support rod member 8 provided so as to be movable along the X-axis direction shown in FIGS. 1 to 3, a carriage 9 provided on the moving support rod member 8 and movable along the Y-axis direction shown in FIGS. 1 and 3, and respective drive units (not shown) for allowing the moving support rod member 8 and carriage 9 to free run.

The moving support rod member 8 is provided above the conveying device 2 so as to straddle the base 10 provided around the conveying device 2, and it is arranged so as to be horizontally reciprocated along the X-axis direction by a drive unit (not shown) controlled by the controller 7.

The carriage 9 is disposed along a rail 12 provided in an upper portion of the moving support rod member 8, and is arranged so as to be horizontally reciprocated along the Y-axis direction by a drive unit (not shown) controlled by the controller 7.

The carriage 9 has an ink jet section (not shown) of the printing means 5 and also the image pickup device 6, both mounted thereon. With the carriage 9 moved, the image pickup device 6 moves together with the ink jet section (not shown).

As the image pickup device 6, a CCD camera employing a charge coupled-device as an image pickup device is used. The image pickup device 6 is disposed in a bracket 14 provided on the side of the carriage 9, and is arranged so that the image of at least one portion of a printed pattern printed on the print medium therebelow can be picked up. Here, the image pickup device 6 may be disposed on the base 10 or a support member (not shown) provided on a floor, ceiling or the like to pick up the image of the aforementioned print, instead of being mounted on the carriage 9.

Besides the ink jet section (not shown) mounted on the carriage 9 as described above, the printing means 5 comprises a plurality of ink cartridges 15 filled with respective color inks and lines (not shown) for introducing the respective color inks to the ink jet section (not shown). The color of a color ink to be jetted from the ink jet section (not shown) to the print medium 3 therebelow is selected by the controller 7.

The controller 7 is a CAD (computer-aided design) device in the illustrated example. This cad device comprises a monitor 11 and a controller body 13, and has a control function with respect to the printing means 5 and moving device 4 and the like, as well as an arithmetic control function of detecting a position deviation of a pattern during printing to perform a correction.

When a pattern is to be printed onto the print medium 3 by the automatic printer 1 as described above, in the effective printing region in the conveying device 2 constituting the predetermined place, pattern data longer than the effective printing region 16 is allocated to a plurality of consecutive regions in the print medium 3, and the print medium 3 is intermittently conveyed to the effective printing region 16 by the conveying device 2 to perform pattern printing.

Specifically, the moving support rod member 8 and the carriage 9 controlled by the control drive section 22 of the controller body 13, are moved to the predetermined position from which printing starts (i.e., moved along the X-axis and/or Y-axis), and then inks of colors specified by the controller 7 are successively jetted from the ink jet section not shown), whereby a portion of, for example, a repetitively continuing pattern (entire pattern) is printed in a first allocated region of the print medium 3 located in the effective printing region 16.

Thereafter, the image of a portion or all of the printed pattern is picked up by the image pickup device 6. This picked-up image is once stored in a storage section 17 via an input section 21 (see FIG. 4). After the aforementioned image pickup, the allocated region portion of the print medium 3 on which printing has been performed is forwarded, thereby positioning a next allocated region in the effective printing region 16. Then, the image of the pattern precedently printed is again picked up by the image pickup device 6, and this picked-up image is stored in the storage section 17 via the input section 21. These images of the patterns picked up before and after the forwarding are subjected to an arithmetic comparison therebetween in a computing section 18.

When these images are not deviated from each other, a next pattern is printed following the pattern precedently printed in accordance with the reference pattern print data preliminarily stored in the storage section 17 of the controller body 13, without correcting position deviation.

When the images are deviated from each other, an arithmetic correction such that the two images coincide with each other is automatically performed in the computing section 18 of the controller body 13, and the reference pattern print data is corrected with respect to the image position of the pattern precedently printed. Then, control signals are transmitted from an output section 20 to the control drive section 22 for the moving device 4 and the printing means 5 to control the moving device 4 and the printing means 5 (i.e., to actuate drive motors and the like), and after the tips of nozzles in the ink jet section (not shown) of the carriage 9 are positioned at the joint between the pattern precedently printed and a pattern to be next printed, printing is performed in a state where the joint position of the pattern precedently printed and that of a pattern to be next printed are conformed to each other. Here, the above-described reference pattern print data is data for printing a desired pattern onto the print medium 3, and is preliminarily inputted and stored in the storage section 17 of the controller 1. Regarding the correction in the above-described case, when an angle correction is needed, the reference pattern print data is corrected as described above. When no angle correction is needed, the above-described deviation can be corrected by a coordinate conversion on the moving device 4 side, in a state where the reference pattern print data is not corrected. Printing after such a correction makes it possible to print consecutive patterns one after another without joint positions of repetitively continuing patterns (i.e., an entire pattern) deviating from one another.

As semiautomatic processing, processing may be performed such that a deviation amount is detected by, for example, synthesizing the above-described two images in an image synthesizing section 19, synthetically displaying it on a monitor 11 via the output section 20, and manipulating the displayed image, and such that an instruction to correct the deviation amount is artificially inputted into the controller body 13 through an input section 21. Such processing is useful for the case of a print design with an image being difficult to recognize.

The portion to be photographed has not to be a pattern of print design, but ends of the print pattern may be portions to be photographed. However, because it is necessary to detect deviations in the conveying direction (X-axis direction) of the conveying device 2 and that in the width direction (Y-axis direction) of a sheet material, the aforementioned "ends" refer to the ends in the respective directions. Particularly when printing is to be performed onto fabric as the print medium 3, the fabric cannot be used across a full width since each edge of the fabric in the width direction has a selvage. As a result, when repetitively continuing patterns (i.e., an entire pattern) is printed, printed portions and non-printed portions appear in the selvage parts. Of course, also in a place where printing has been interrupted in order to perform conveyance by the conveying device 2, edge portions similarly occur on the boundary between a printed portion and a portion to be next printed in the conveying direction of the conveying device 2. The present invention corrects deviations by taking advantage of edge portions in the X-axis and Y-axis directions. On the other hand, when printing the patterns of components that are independent of one another, instead of printing a long consecutive pattern as described above, a corner portion of the component that has been printed onto an allocated region of the print medium 3, can be assumed to be the coordinate values (X1, Y1) of a pattern coordinate point, and their inclination with respect to reference coordinate values (X, Y) and a conveyance error can be corrected to perform printing.

Next, in another pattern joint-position correction printing method in pattern printing onto a print medium, as in the case of the above-described example, pattern data longer than the effective printing region 16 in a predetermined place is allocated to a plurality of regions, and the carriage 9 is moved to a preceding allocated region. Then, the tips of nozzles in the ink jet section (not shown) is positioned to the starting position of a pattern to be printed, and predetermined color inks are jetted under the control of the controller 7, thereby printing a portion of the pattern.

Thereafter, the printed region portion is forwarded from the effective print region 16 in order to position a next allocated region in the effective region 16, and then the image of at least one portion of the pattern in the forwarded allocated region is picked up by the image pickup device 6. This picked-up image is once stored via the input section 21, and the stored image and the reference pattern print data preliminarily inputted in the storage section 17 of the controller 7 are compared with each other by the computing section 18 of the controller 7. When the positions of the images in the corresponding portions are deviated from each other, an arithmetic correction is performed to the deviation by the computing section 18. Then, as in the case of the above-described example, control signals are transmitted from the output section 20 to the control drive section 22 for the moving device 4 and the printing means 5 to control the moving device 4 and the printing means 5 (i.e., to actuate drive motors and the like), and after the tips of nozzles in the ink jet section (not shown) of the carriage 9 are positioned at the joint between the pattern precedently printed and a pattern to be next printed, printing is performed in a state where the joint position of the pattern precedently printed and that of a pattern to be next printed are conformed to each other.

In this correction printing method, for example, the position data (X-coordinate, Y-coordinate) of an arbitrarily determined point in a photographed pattern portion in the course of printing, and the above-described position data of the reference pattern print data that has been inputted, are compared with each other by the controller 7, thereby checking for a position deviation. When they are deviated from each other, an arithmetic correction is performed to the deviation, and printing is performed in a state where the joint position of the pattern precedently printed and that of a pattern to be next printed are conformed to each other.

In another example of a correction printing method, the outline of a picked-up image is extracted, and this outline data and the corresponding data in the reference pattern print data are compared with each other by the controller 7, thereby checking for a position deviation. When they are deviated from each other, an arithmetic correction is performed to the deviation, and printing is performed in a state where the joint position of the pattern precedently printed and that of a pattern to be next printed are conformed to each other. Alternatively, a deviation amount is directly determined by synthetically displaying the above-described picked-up image and the reference pattern print data on the monitor 11. When they are deviated from each other, the deviation is corrected, and printing is performed in a state where the joint position of the pattern precedently printed and that of a pattern to be next printed are conformed to each other.

INDUSTRIAL APPLICABILITY

As described above, in the automatic printer according to the present invention, pattern data longer than the effective printing region in a predetermined place can be allocated to a plurality of regions to successively print onto a print medium such as fabric, paper, or knit cloth, and in pattern joint positions between individual regions, printing can be performed in a state where the pattern precedently printed and that to be next printed are conformed to each other. This allows a desired pattern to be correctly printed without various patterns deviating from one another at joint print positions.

Furthermore, in the automatic printer according to the present invention, the image of a printed pattern is picked up before conveyance, and is again picked up after the conveyance to thereby compare these two images. When these images deviate to each other, printing is performed in a state where the joint position of the pattern precedently printed and that of a pattern to be next printed are conformed to each other. This makes it possible to perform printing with the patterns correctly jointed without causing a position deviation at the joint positions, even if a next allocated region of the print medium to be printed cannot be correctly set in a predetermined place to be printed, due to meandering or the like of the print medium. This leads to the prevention of the occurrence of defective products in which prints are deviated from one another.

Moreover, in the automatic printer according to the present invention, a portion of a pattern is printed in a preceding allocated region by the printing means and forwarded, and thereafter the image of the pattern in the forwarded allocated region is picked up by the image pickup device to compare this picked-up image with the reference pattern print data by the controller. When the positions of the images in the corresponding portions are deviated from each other, an arithmetic correction is performed to the deviation, and printing is performed in a state where the joint position of the pattern precedently printed and that of a pattern to be next printed are conformed to each other. This allows printing to be performed with the patterns correctly jointed without causing a position deviation at joint positions, resulting in the prevention of the occurrence of defective products in which prints are deviated from one another.

What is claimed is:

1. An automatic printer comprising:
a conveying device for intermittently conveying a print medium to a predetermined place;
a moving device provided above the predetermined place and having a carriage that is moved thereby in an arbitrary direction;
printing means having an ink jet section mounted on the carriage, for printing a pattern onto the print medium;
an image pickup device mounted on the carriage, for picking up the image of a pattern printed on the print medium in the predetermined place; and
a controller for controlling the conveying device, moving device, printing means, and image pickup device,
wherein the controller performs control operations comprising:
allocating pattern data longer than the effective printing region in the predetermined place to a plurality of regions;
printing a portion of the pattern onto a preceding allocated region by the printing means;
picking up images of the pattern portions including, in the printed pattern, the boundary between the pattern already printed and a portion to be next printed in the conveying direction of the print medium, and the boundary between the printed portion and the non-printed portion in the width direction of the print medium;
forwarding, after the image pickup, the printed region portion from the effective printing region in order to position a next allocated region in the effective region;
again picking up the pattern portion of which the image has been picked up by an image pickup device;
mutually comparing the images of the respective patterns picked up before and after the forwarding;
performing, when said two images are deviated from each other, an arithmetic correction so that said two images coincide with each other;
correcting reference pattern print data with respect to the image position of the precedently printed pattern; and
performing a printing operation in a state where the joint position of the pattern precedently printed and that of a pattern to be next printed are conformed to each other.

2. An automatic printer comprising:
a conveying device for intermittently conveying a print medium to a predetermined place;
a moving device provided above the predetermined place and having a carriage that is moved thereby in an arbitrary direction;
printing means having an ink jet section mounted on the carriage, for printing a pattern onto the print medium;
an image pickup device mounted on the carriage, for picking up the image of a pattern printed on the print medium in the predetermined place; and
a controller for controlling the conveying device, moving device, printing means, and image pickup device,
wherein the controller performs control operations comprising:
allocating pattern data longer than the effective printing region in the predetermined place to a plurality of regions;
printing a portion of the pattern onto a preceding allocated region by the printing means;
forwarding the printed region portion from the effective printing region in order to position a next allocated region in the effective region;
thereafter picking up the image of at least one portion of the pattern in the forwarded allocated region by the image pickup device;
comparing the picked-up image with reference pattern print data;
performing, when the positions of the images in the corresponding portions are deviated from each other, an arithmetic correction to the deviation; and
performing a printing operation in a state where the joint position of the pattern precedently printed and that of a pattern to be next printed are conformed to each other.

* * * * *